Figure 1:
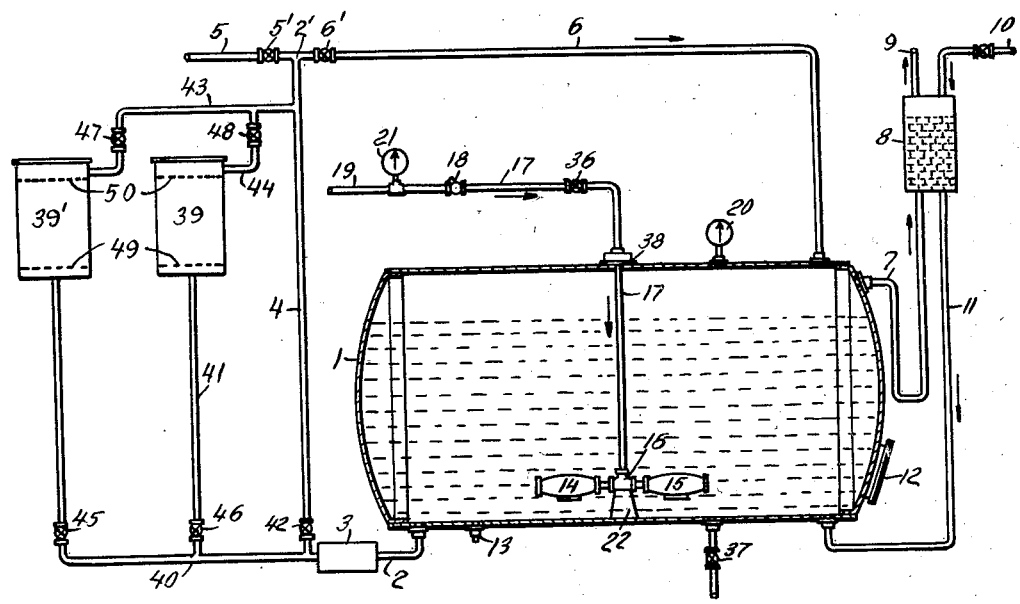

Dec. 3, 1935.  E. W. HARVEY  2,023,199

PROCESS FOR THE TREATMENT OF LIQUIDS WITH AMMONIA

Filed Oct. 20, 1932

INVENTOR
Edward W. Harvey
BY
ATTORNEY

Patented Dec. 3, 1935

2,023,199

UNITED STATES PATENT OFFICE 2,023,199

PROCESS FOR THE TREATMENT OF LIQUIDS WITH AMMONIA

Edward W. Harvey, Highland Park, N. J., assignor to The Barrett Company, New York, N. Y., a corporation of New Jersey Application October 20, 1932, Serial No. 638,784

2 Claims. (Cl. 23—5)

This application is a continuation in part of my copending United States patent application Serial No. 355,802, filed April 17, 1929. In said application there is disclosed and claimed a process for treating liquids with anhydrous liquid ammonia, and particularly a process for the production of aqua ammonia by directly introducing anhydrous liquid ammonia into water. The invention of the present application relates more particularly to the treatment of solutions of soluble substances with liquid ammonia, which subject matter is disclosed in the aforesaid application Serial No. 355,802.

Solutions of ammonia have heretofore been prepared by dissolving gaseous ammonia in a liquid. In many commercial operations, however, the ammonia is supplied in the anhydrous form as a liquid in tank cars or other containers. It is impracticable to evaporate the liquid from these containers in order to obtain gaseous ammonia without providing means for heating the container to counteract the cooling effect of the vaporizing ammonia which tends to chill the remaining liquid and thus make exceedingly slow further vaporization. Supplying heat to the shipping containers is a troublesome and expensive operation, the alternative to which has been to provide high pressure storage facilities for liquid ammonia and withdraw the ammonia from the shipping containers and pass it into the storage tanks directly as liquid. The storage tanks were so arranged that the liquid ammonia could be volatilized as required for use. When aqua ammonia, for example, was to be prepared from ammonia supplied as a liquid, the liquid ammonia was heated sufficiently to change it from the liquid to the gaseous state and the gas thus formed absorbed in water. The ammonia gas reacted with the water to form aqua ammonia, and as a result of that chemical reaction, large quantities of heat were developed. Since the absorption of ammonia by water is favored by low temperatures in that with increasing temperatures there is a decrease both in the rate at which ammonia is absorbed and the ultimate concentration in the liquid of ammonia which may be obtained under a given gas pressure at the surface of the liquid, it was necessary either to introduce the gas into the water sufficiently slowly so that the heat generated could be dissipated to the atmosphere without excessively high temperatures being attained or to artificially remove heat from the absorbing water, for example, by means of cooling water. The former methods of producing aqua ammonia from liquid ammonia involved, therefore, both the supplying of heat to the liquid ammonia in order to convert it into the gas and the removal of heat from the absorbing water. The production of large quantities of aqua ammonia was, therefore, a slow and expensive operation.

My invention has for an object the production of solutions of ammonia from liquid ammonia in a simple expeditious manner, which does away with the necessity for first vaporizing the liquid and the attendant need for supplying heat thereto. It is another object of my invention to counterbalance to a large extent the heat evolved by the reaction of the ammonia with the liquid in which it is absorbed and thus to provide a process in which the liquid may be relatively quickly treated with substantial amounts of ammonia without the necessity of artificially cooling the liquid as heretofore required. Further, it is an object of my invention to provide a process in which constituents of the liquor into which anhydrous liquid ammonia is introduced act to maintain a low vapor pressure of the liquid thereby facilitating the complete absorption of the ammonia and permitting the production of solutions having a relatively high ammonia content. Other objects of the invention will in part be obvious and will in part appear hereinafter.

I have discovered that liquid ammonia may be directly introduced under the surface of or otherwise mixed with liquids with which it reacts or in which it is soluble without explosive effect or violent reaction, and that by so doing, the absorption of the ammonia may be conducted rapidly and completely without necessitating the removal of the large quantities of heat which it was heretofore necessary to remove in order to prevent excessive increases in the temperature of the absorbing liquid. I have further discovered that by utilizing for the absorption of liquid ammonia solutions of materials soluble in the resulting ammoniacal liquor, and particularly solutions in water of inorganic and organic salts, that the presence of the dissolved material acts to maintain a relatively low vapor pressure of the liquor during and after the absorption of the ammonia and thus facilitates obtaining a complete absorption of the ammonia and the production of relatively concentrated ammoniacal liquors.

My invention may be employed for introducing ammonia into a large variety of liquids. For example, mixtures of aqua ammonia and solutions of inorganic or organic salts may be produced. The liquid ammonia may be introduced into waste solutions, such as liquid or semi-liquid slaughter house refuse or sugar refining refuse for the production of material for use as a fertilizer. Solutions containing acids or solutions containing both acids and salts might be treated with the ammonia for the production of salts, separation of materials, or other known purposes for which ammonia may be employed. Aqueous solutions of fertilizer salts, for example, aqueous solutions of ammonium nitrate, sodium nitrate, ammonium chloride, ammonium sulfate or urea, are particularly suitable for the absorption of liquid ammonia in accordance with the process of this invention. Two or more materials may be present in the solution, and of particular suitability are the solutions in water of sodium nitrate and urea or of ammonium nitrate and urea. Solutions of a plurality of substances such as the foregoing are especially suitable for the absorption of ammonia when it is desired to obtain an ammoniacal liquor containing relatively high proportions of dissolved solid material and ammonia since the several materials exercise a mutual influence upon each other's solubility in aqueous ammoniacal solutions to increase their solubility and thereby to increase the amount of material which may be retained in solution at a given temperature.

The ammoniacal solutions of the foregoing fertilizer materials are of value in the production of mixed fertilizers, for example, by their addition to superphosphate or to triple superphosphate. Their relatively low vapor pressure facilitates not only their preparation but also their shipment and handling in preparing the mixed fertilizers.

Figure 2:
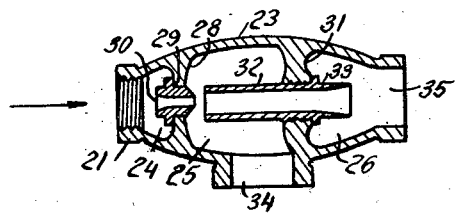

A suitable apparatus for carrying out the process of my invention is illustrated in the accompanying drawing in which Fig. 1 is a view, partly in section, of a dissolving tank, and Fig. 2 illustrates in section, one of the jet eductors shown in Fig. 1.

The apparatus illustrated in the drawing comprises a closed tank 1 for containing a charge of the liquid to be treated with ammonia. Pipe 2 opens into one end of tank 1 near the bottom and is connected with the inlet of a pump 3. Outlet pipe 4 is branched at 2' and communicates with pipes 5 and 6, each of which is provided with a valve 5' and 6' respectively. Pipe 6 opens into tank 1 near the top and at the opposite end from pipe 2. Two containers or dissolvers 39 and 39' communicate through pipes 40 and 41, leading from the bottoms of containers 39 and 39', with pipe 4 at a point between a valve 42 and pump 3 and through pipes 43 and 44, leading from the upper portions of the two containers, with pipe 4 at a point between valve 42 and pipe 6. Pipes 40, 41, 43 and 44 are provided with valves 45, 46, 47 and 48 respectively. The tops of containers 39 and 39' are arranged for ready removal and replacement. Each container is provided at a short distance above its bottom with a screen 49 and in the upper portion another screen 50 positioned below the point at which pipe 43 or 44 opens from the containers. The top screens 50 are arranged for ready removal and replacement when the top of the container is removed. A U-pipe 7 opens into the top of tank 1 above the normal liquid level therein, and is connected with a chamber 8 containing packing material such as is used in gas scrubbers. Chamber 8 is provided with a gas vent 9, a water supply pipe 10 and a return pipe 11 leading back into the bottom of tank 1. An inlet 37 provided with a valve serves for filling the tank with the liquid to be treated. A manhole 12 permits access to the interior of tank 1 for making adjustments or repairs, and a drain 13, which is normally closed, permits any liquid residue to be drained from the tank. Tank 1 may also be provided with a gauge glass and a thermometer for ascertaining the level and the temperature of liquid therein.

Within tank 1, and placed below the normal liquid level therein, are two jet eductors 14 and 15, both of which communicate through a T-connection 16 with a liquid ammonia supply pipe 17 which passes through a gas tight manhole 38 in the top of the tank. T-connection 16 is mounted on a base 22 secured to the bottom of tank 1. Pipe 17 is fitted with a valve 36, check valve 18 which prevents the passage of liquid except in the direction towards the eductors, and a flexible coupling 19 which may be fitted to a liquid ammonia container, such as a tank car so that the liquid ammonia may be passed through pipe 17 to the eductors. Pressure gauges 20 and 21 are provided for tank 1 and pipe 17 respectively.

The jet eductors 14 or 15, as shown in Fig. 2, comprise a casing 23 which defines three chambers 24, 25 and 26. An internally threaded flange 27 serves to secure the eductor to an externally threaded arm of T-connection 16 as shown in Fig. 1. A partition 28 between pressure chamber 24 and chamber 25 is pierced by a nozzle 29 which has a restricted orifice 30 tapering from the inlet end in pressure chamber 24 towards the outlet end in chamber 25. A partition 31 between chambers 25 and 26 is pierced by a tube 32 of larger internal diameter than the outlet end of orifice 30. The tube 32 is reamed out at its outlet end in chamber 26 as shown at 33 and extends within chamber 25 to a point adjacent to the end of nozzle 29 but spaced therefrom sufficiently to allow of liquid in chamber 25 being drawn into and through tube 32 by the action of a jet of fluid forced through nozzle 29. An opening 34 is provided in casing 23 for admitting a liquid in which the eductor is immersed to chamber 25. Opening 34 may, if desired, be covered by a screen not shown in the drawing. A second opening 35 in casing 23 is centered opposite the outlet end of tube 32, and through this opening the materials ejected from tube 32 pass into the body of liquid in tank 1.

In making an ammoniacal solution employing the apparatus described above, a charge of the solution in which ammonia is to be absorbed is run into tank 1 through inlet 37. Flexible coupling 19 is connected to a liquid ammonia container so arranged that by opening valve 36 the liquid is discharged through coupling 19, pipe 17 and T-connection 16 to chamber 24 of eductors 14 and 15. The liquid ammonia in the container at ordinary temperatures, is under a relatively high pressure due to the high vapor pressure of liquid ammonia at ordinary temperature. The liquid ammonia in chamber 24 is, therefore, under a substantial pressure and is vented from chamber 24 as a rapidly moving jet through nozzle 29 and tube 32 which acts to draw a stream of solution from the body of liquid in tank 1 outside the eductor through opening 34 and circulate it as a confined stream flowing through chamber 25 and tube 32 back to the body of liquid. The pressure upon the liquid ammonia after it passes valve 36 decreases in its travel through pipe 17, and a portion of the liquid ammonia may be volatilized and serve to precool the ammonia which subsequently reacts with the solution. This tends to neutralize the heat effect of the reaction. In addition, the solution in the tank may be cooled by heat transfer through the walls of the pipe. If desired, this indirect cooling of the contents of the tank may be facilitated by developing pipe 17 as a coil immersed in the liquid in the tank. When the unvolatilized portion of the liquid ammonia is introduced into the solution at the exit end of nozzle 29, further volatilization probably takes place and an intimate admixture of gaseous ammonia, liquid ammonia and solution is formed and ejected from tube 32. The ammonia and solution are cooled and simultaneously react to form an ammoniacal liquid. The materials are forced through opening 35 and serve to agitate the contents of tank 1. In this manner liquid ammonia and the solution are intimately admixed and the ammonia and solution rapidly and completely react to form the desired ammoniacal liquid. While the ammonia is being passed into the solution, valves 5', 45, 46, 47 and 48 are closed and valves 6' and 42 are open. Pump 3 may then be in operation if desired to circulate liquor from the bottom of tank 1 through pipes 2, 4 and 6 to the top of the tank and thus aid to keep the liquid contents of the tank uniform.

Any unabsorbed gases are vented from above the surface of the liquid through U-pipe 7 and are scrubbed in chamber 8 by water or a solution corresponding to that first introduced into tank 1, which is passed into chamber 8 from pipe 10. The small amount of ammonia contained in these gases is removed by absorption in the water or solution and the weak ammoniacal solution returned through pipe 11 to mingle with the contents of the tank. The residual gases are discharged from chamber 8 through vent 9. When gases cease passing through pipe 7, liquid from chamber 8 drains down into pipe 7 where it is retained by the U-bend to form a seal between the atmosphere and the interior of tank 1. It is self-evident that this seal also will serve as an automatic pressure relief device, which operates either whenever the pressure within the tank builds up to any considerable extent above atmospheric or whenever it falls and a vacuum is created within the tank.

When liquid ammonia is absorbed in an aqueous solution, the heat evolved is materially less than when a like quantity of gaseous ammonia is absorbed. Nevertheless, there is a tendency for the liquid in tank 1 to increase somewhat in temperature, and in some cases, particularly when solutions containing a relatively high percentage of $NH_3$ is to be prepared, it may be advisable to cool the contents of the tank during the reaction. This cooling may be accomplished by spraying the outside of the tank with cooling water or in any other manner.

After the desired quantity of ammonia has been introduced into the solution, which may be ascertained either by analysis of samples withdrawn from the tank, or preferably, by introducing a measured quantity of ammonia into a known amount of solution, the supply of liquid ammonia is cut off by closing valve 36. By closing valve 6' and opening valve 5', the ammoniacal solution may be pumped from the tank through pipe 5 to storage or directly to the place it is to be used.

Where it is desired that the final ammoniated product of this process contains greater proportions of dissolved salts than are soluble in water at ordinary temperatures, or if it be desired to simultaneously dissolve a solid material in the water while the liquid is being ammoniated by the introduction of liquid ammonia in accordance with this process, the solid material may be added to the liquid in tank 1 and dissolved therein. Dissolvers 39 and 39', however, are provided in the apparatus shown in the accompanying drawing whereby solid material may be dissolved in the liquid being ammoniated simultaneously with the ammoniation treatment without introducing the solid directly into tank 1. Thus, with valves 44 and 46 closed the top of dissolver 39 and screen 50 may be removed and the dissolver charged with the solid material. After screen 50 and the top of the dissolver are replaced valves 46 and 44 may be opened and valve 42 closed. Liquid withdrawn from tank 1 through pipe 2 by means of pump 3 will then pass through dissolver 39, where it will dissolve the solid material contained therein, and be returned through pipe 6 to tank 1. Dissolver 39' may be similarly operated.

The two dissolvers 39 and 39' are provided so that while the ammoniated liquid is being passed through one dissolver the other may be opened and recharged with solid material to be dissolved in the liquid and/or different materials may be introduced into the two dissolvers where a solution containing more than one dissolved constituent is being prepared. In this case by regulating the flows of liquid through the two dissolvers any desired proportions of the different materials may be introduced into the ammoniated liquid.

The use of dissolvers 39 and 39' for introducing material into the ammoniacal solution is particularly of importance where it is not desired that solid material be present in the liquid in tank 1. Certain materials such as sodium nitrate, for example, show the property of a decreasing solubility in water as ammonia is introduced into the aqueous solution of the sodium nitrate. The solubility of the sodium nitrate goes through a minimum and then increases with increasing concentrations of ammonia. In preparing a concentrated solution of sodium nitrate and ammonia, a solution of sodium nitrate in water containing insufficient sodium nitrate to form solid crystals as ammonia is introduced into the solution may be filled into tank 1 and this solution ammoniated until the point of minimum solubility of the sodium nitrate has been passed. The solution, as additional ammonia is absorbed therein, may then be passed through sodium nitrate in dissolvers 38 and 39 to dissolve additional sodium nitrate in the solution as the ammonia content is increased, and thus obtain the desired highly concentrated solutions without at any time crystallization of solid occurring in tank 1.

The following examples illustrate solutions which may be prepared in accordance with this invention:

*Example I.*—A solution of sodium nitrate in water containing 85 parts of sodium nitrate to every 100 parts of water may be introduced into tank 1 of the apparatus shown in the drawing and liquid ammonia absorbed in the solution until the desired concentration of ammonia is attained. An ammoniacal solution containing sodium nitrate may likewise be prepared as follows: A solution of about 15 parts of sodium nitrate in 20 parts of water is introduced into tank 1 and liquid ammonia passed into the solution. When about 20 parts of ammonia have been thus introduced into the solution the ammoniated liquor may be circulated through the dissolvers which have been charged with solid sodium nitrate and additional sodium nitrate dissolved in the liquor while the introduction of ammonia is continued. When the ammoniated liquor contains about 45 parts of sodium nitrate to 20 parts of water to about 36 parts of ammonia the ammoniation treatment is discontinued and the solution withdrawn from tank I for use.

*Example II.*—A solution containing 200 parts of ammonium nitrate in 100 parts of water is treated with anhydrous liquid ammonia in the apparatus described above until the desired proportion of ammonia has been introduced into the solution. An ammoniacal solution containing ammonium nitrate may likewise be prepared by introducing anhydrous liquid ammonia into a solution of ammonium nitrate in water in the proportions of about 100 parts of ammonium nitrate to 100 parts of water and, while the ammonia is being introduced into the liquor, solid ammonium nitrate may be dissolved therein in amount sufficient to give a solution containing about 350 parts of ammonium nitrate for every 100 parts of water. When the ammoniacal content of the solution has been increased to about 100 parts of ammonia for every 100 parts of water the ammoniation treatment is discontinued.

*Example III.*—Solutions of ammonium nitrate and urea in water may be ammoniated to prepare a liquid composition containing about 15 parts of urea, 55 parts of ammonium nitrate, 14 parts of ammonia and 14 parts of water by the direct introduction of liquid anhydrous ammonia into a solution of ammonium nitrate and urea. Liquid compositions containing the following ingredients may likewise be prepared in a similar manner:

(a) Urea, 340 parts; sodium nitrate, 150 parts; water, 255 parts; ammonia, 255 parts.

(b) Urea, 150 parts; sodium nitrate, 320 parts; water, 265 parts; ammonia, 265 parts.

(c) Urea, 165 parts; ammonium nitrate, 560 parts; water, 135 parts; ammonia, 140 parts.

(d) Urea, 375 parts; ammonium nitrate, 245 parts; water, 200 parts; ammonia, 180 parts.

It is apparent that numerous modifications may be made in the apparatus described or that the process may be carried out in other types of apparatus. For example, a single eductor of the type described may be employed; or, if desired, the liquid ammonia may be introduced into the absorbing liquid from a submerged pipe venting into the body of liquid although this practice is not to be preferred since as thorough a mixing action is not obtained as when employing a jet eductor. Furthermore, if highly concentrated ammonia solutions which have a vapor pressure greater than atmospheric at the temperatures attained by the material in tank I are to be prepared, it is necessary to absorb the ammonia at super-atmospheric pressures. In such a case the alterations in the apparatus described which would be required to fit it for use at increased pressures, are readily apparent to one skilled in the art.

I claim:

1. The process for the preparation of ammoniacal solutions of a soluble salt which comprises introducing liquid ammonia directly into an aqueous solution of said salt and simultaneously with the treatment of the aqueous solution with liquid ammonia, dissolving in the ammoniacal solution additional quantities of said salt.

2. The process for the preparation of an ammoniacal solution of sodium nitrate which comprises introducing liquid ammonia directly into an aqueous solution of sodium nitrate and simultaneously with the treatment of the aqueous solution with liquid ammonia, dissolving in the ammoniacal solution additional sodium nitrate.

EDWARD W. HARVEY.